US007072994B2

(12) United States Patent
Britton

(10) Patent No.: US 7,072,994 B2
(45) Date of Patent: Jul. 4, 2006

(54) METHOD, SYSTEM, AND PROGRAM FOR DETERMINING A NUMBER OF DEVICE ADDRESSES SUPPORTED BY A TARGET DEVICE AND CONFIGURING DEVICE ADDRESSES USED BY A SOURCE DEVICE TO COMMUNICATE WITH THE TARGET DEVICE

(75) Inventor: Thomas George Britton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 10/096,055

(22) Filed: Mar. 12, 2002

(65) Prior Publication Data

US 2003/0177266 A1   Sep. 18, 2003

(51) Int. Cl.
*G06F 12/06* (2006.01)
*G06F 12/14* (2006.01)
*G06F 11/00* (2006.01)
*G06F 13/00* (2006.01)

(52) U.S. Cl. .................. 710/9; 710/8; 710/10; 710/15; 710/16; 711/161; 711/162; 713/1; 713/100; 370/40; 370/312

(58) Field of Classification Search .............. 710/8–10, 710/15, 16; 711/161, 162; 713/1, 100; 370/40, 370/312
See application file for complete search history.

(56) References Cited

U.S. PATENT DOCUMENTS

| 5,237,689 | A | | 8/1993 | Behnke |
|---|---|---|---|---|
| 5,835,485 | A | * | 11/1998 | Grube et al. ................ 370/312 |
| 5,987,533 | A | | 11/1999 | Hong |
| 6,044,442 | A | | 3/2000 | Jesionowski |
| 6,058,454 | A | | 5/2000 | Gerlach et al. |
| 6,061,794 | A | | 5/2000 | Angelo et al. |
| 6,189,079 | B1 | | 2/2001 | Micka et al. |
| 6,247,069 | B1 | | 6/2001 | Smyers |
| 6,304,980 | B1 | | 10/2001 | Beardsley et al. |
| 6,931,468 | B1 | * | 8/2005 | Smith et al. ................ 710/104 |
| 2003/0088638 | A1 | * | 5/2003 | Gluck et al. ................ 709/217 |

OTHER PUBLICATIONS

Kadleck, Barry, Andrew Bentley, Wolfgang Kessel, and Anthony Vulic. "IBM TotalStorage Peer-to-Peer Virtual Tape Server Planning and Implementation Guide", © IBM Corporation 2002, pp. 1-310.

\* cited by examiner

*Primary Examiner*—Tammara Peyton
(74) *Attorney, Agent, or Firm*—David W. Victor; Konrad Raynes & Victor LLP

(57) ABSTRACT

Provided are a method, system, and program for configuring device addresses used by a source device to communicate with at least one target device. A determination is made of a number of device addresses supported by a target device and an identifier of the source device. The determined identifier and the number of device addresses supported by the target device are used to determine device addresses from the device addresses supported by the target device to communicate with the target device.

44 Claims, 5 Drawing Sheets

FIG. 3

| AX0 | VTS[0] | Copy[0] | Broadcast[0] | VTS[1] | Copy[1] | Broadcast[1] |
|---|---|---|---|---|---|---|
| AX0[0] | 0-F | 40-42 | 4C-4F | 120-12F | 160-162 | 16C-16F |
| AX0[1] | 10-1F | 43-45 | 4C-4F | 130-13F | 163-165 | 16C-16F |
| AX0[2] | 20-2F | 46-48 | 4C-4F | 140-14F | 166-168 | 16C-16F |
| AX0[3] | 30-3F | 49-4B | 4C-4F | 150-15F | 169-16B | 16C-16F |

64 Customer Device Address Configuration

FIG. 4

| AX0 | VTS[0] | Copy[0] | Broadcast[0] | VTS[1] | Copy[1] | Broadcast[1] |
|---|---|---|---|---|---|---|
| AX0[0] | 0-F | 80-82 | 98-9F | 120-12F | 1A0-1A2 | 1B8-1BF |
| AX0[1] | 10-1F | 83-85 | 98-9F | 130-13F | 1A3-1A5 | 1B8-1BF |
| AX0[2] | 20-2F | 86-88 | 98-9F | 140-14F | 1A6-1A8 | 1B8-1BF |
| AX0[3] | 30-3F | 89-8B | 98-9F | 150-15F | 1A9-1AB | 1B8-1BF |
| AX0[4] | 40-4F | 8C-8E | 98-9F | 160-16F | 1AC-1AE | 1B8-1BF |
| AX0[5] | 50-5F | 8F-91 | 98-9F | 170-17F | 1AF-1B1 | 1B8-1BF |
| AX0[6] | 60-6F | 92-94 | 98-9F | 180-18F | 1B2-1B4 | 1B8-1BF |
| AX0[7] | 70-7F | 95-97 | 98-9F | 190-19F | 1B5-1B7 | 1B8-1BF |

128 Customer Device Address Configuration

| AX0 | VTS[0] | Copy[0] | Broadcast[0] | VTS[1] | Copy[1] | Broadcast[1] |
|---|---|---|---|---|---|---|
| AX0[0] | 00-1F | 100-102 | 118-11F | 120-13F | 220-222 | 238-23F |
| AX0[1] | 20-3F | 103-105 | 118-11F | 140-15F | 223-225 | 238-23F |
| AX0[2] | 40-5F | 106-108 | 118-11F | 160-17F | 226-228 | 238-23F |
| AX0[3] | 60-7F | 109-10B | 118-11F | 180-19F | 229-22B | 238-23F |
| AX0[4] | 80-9F | 10C-10E | 118-11F | 1A0-1BF | 22C-22E | 238-23F |
| AX0[5] | A0-BF | 10F-111 | 118-11F | 1C0-1DF | 22F-231 | 238-23F |
| AX0[6] | C0-DF | 112-114 | 118-11F | 1E0-1FF | 232-234 | 238-23F |
| AX0[7] | E0-FF | 115-117 | 118-11F | 200-21F | 235-237 | 238-23F |

256 Customer Device Address Configuration

METHOD, SYSTEM, AND PROGRAM FOR DETERMINING A NUMBER OF DEVICE ADDRESSES SUPPORTED BY A TARGET DEVICE AND CONFIGURING DEVICE ADDRESSES USED BY A SOURCE DEVICE TO COMMUNICATE WITH THE TARGET DEVICE

BACKGROUND OF THE INVENTION

1. Field of the Invention

The present invention relates to a method, system and program for configuring a source device to communicate with at least one target device.

2. Description of the Related Art

A virtual tape storage system consists of data management software and a pool of hard disk drives that caches data to or from tape drives and tape cartridges. Host systems perform input/output (I/O) operations with respect to the tape drives by performing I/O operations with respect to the virtual tape server that emulates the tape storage. In the prior art, one or more virtual tape servers (VTS), such as the International Business Machines (IBM) Magstar** Virtual Tape Server, are each integrated with a tape library comprising numerous tape cartridges and tape drives and a direct access storage device (DASD) comprised of numerous interconnected hard disk drives. The DASD functions as a cache to volumes in the tape library. In VTS operations, the virtual tape server intercepts a host request to access a volume in the tape library and returns data for such requests from the DASD. If the volume is not in the DASD, then the virtual tape server recalls the volume from the tape drive to the DASD. The virtual tape server can respond to host requests for volumes in tape cartridges from DASD substantially faster than responding to requests for data from a tape drive. In this way, the DASD functions as a tape volume cache for volumes in the tape cartridge library.

AIX, ESCON, MAGSTAR, and RS/6000, OS/390, Tivoli are registered trademarks of IBM.

Two virtual tape servers can be combined to create a peer-to-peer virtual tape server system. In a peer-to-peer virtual tape server, two virtual tape servers, each integrated with a separate tape library and DASD, can provide access and storage for the same data volumes (i.e., peer-to-peer environment). In such peer-to-peer VTS systems, if an operation to recall a file from one virtual tape server subsystem and tape library fails, then the file may still be recalled from the other virtual tape server subsystem and tape library. This redundant architecture provides greater data and tape availability and improved data shadowing in the event a tape or VTS in one subsystem is damaged.

In the VTS peer-to-peer system, virtual tape controllers receive host I/O requests and direct such requests to one of the VTS subsystems (an example of a virtual tape controller is the IBM AX0 Virtual Tape Controller ("VTC") which acts as an intelligent switch between the two virtual tape servers). The VTC copies the logical volume from the virtual tape server that received the write to the other virtual tape server. Many peer-to-peer configurations include more than one virtual tape controller to provide redundancy and no single point of failure. When one of the virtual tape controllers is off-line, all host activity is directed to the remaining one or more virtual tape controllers. All virtual tape controllers in a Peer-to-Peer VTS, as a group, elect one of the VTSs to be the focal point or master VTS of the Peer-to-Peer VTS and control the switchover to the other VTS if the master VTS fails. The virtual tape controllers provide a logical view of the peer-to-peer virtual tape system to the host. The virtual tape controllers are also referred in the art as intermediate controllers or directors.

Current Peer-to-Peer VTS systems utilize four VTCs to manage the flow of data between two VTSs. In prior art implementations, each VTS may be addressed through 64 different device addresses, also referred to as customer device addresses, where each of the four VTCs handle 16 of the customer devices addresses to the VTS. Additionally, there are typically three copy device addresses per VTC which provide addresses used for copying updates between the VTSs and four broadcast device addresses used by all the four VTCs to communicate with each other. The VTS must support 80 device addresses for the tape, copy, and broadcast devices. The term "device address" as used herein in connection with customer devices, copy devices and broadcast devices refers to a path to one of these or another components.

As the Peer-to-Peer systems expand and add additional VTCs and VTSs capable of supporting additional customer device addresses beyond 64, the task of configuring the addresses used by the VTCs increases in complexity. Configuration is further complicated if the VTSs in a Peer-to-Peer system have different addressing capabilities, e.g., one supports 64 device addresses and another supports 128 device addresses, and/or the VTCs have different addressing capabilities, e.g., one supports 16 device addresses and another supports 32 device addresses.

For these reasons, there is a need in the art to provide improved techniques for handling configuration of systems in environments where multiple sets of device addresses, such as VTCs, communicate with another set of device addresses, such as VTSs.

SUMMARY OF THE PREFERRED EMBODIMENTS

Provided are a method, system, and program for configuring device addresses used by a source device to communicate with at least one target device. A determination is made of a number of device addresses supported by a target device and an identifier of the source device. The determined identifier and the number of device addresses supported by the target device are used to determine device addresses from the device addresses supported by the target device to communicate with the target device.

In further implementations, there are a plurality of source device addresses each having a unique identifier. Each source device determines device addresses supported by the target device, whereby the device addresses determined by the target devices are non-overlapping.

In yet additional implementations, the target device may comprise a first target device. In such case, determining a number of device addresses supported by the target device further comprises determining the number of device addresses supported by the first target device and a second target device. A minimum of the number of device addresses supported by the first and second target devices is selected, wherein the selected minimum of the number of device addresses is used with the determined identifier to determine the device addresses to communicate with the first and second target devices.

Still further, using the selected minimum number of device addresses and the determined identifier to determine the device addresses may further comprise using the selected minimum number of device addresses and the determined identifier to determine a first set of device addresses to communicate with the first target device and a second set of device addresses to communicate with the second target device.

In further implementations where there are first and second target devices, the determined identifier may be used to determine a first set of copy device addresses used to copy data from the first target device to the second target device and to determine a second set of copy device addresses used to copy data from the second target device to the first target device.

In additional implementations, the target device comprises a first target device and the determined device address range comprises a first set of device addresses. After detecting the availability of a second target device, a determination is made as to whether the number of device addresses supported by the second target device is less than the number of device addresses used to address the first target device. The determined identifier of the source device is used to determine a second set of device addresses to address the second target device if the number of device addresses supported by the second target device is not less than the number of device addresses configured to address the second target device.

The described implementations provide techniques to automatically configure an address space by determining an address range to use to enable communication between one source device and one or more target devices. The determined address range may be based on the identifier of the source device to provide for non-overlapping address ranges for different source devices to use to communicate with the target device.

BRIEF DESCRIPTION OF THE DRAWINGS

Referring now to the drawings in which like reference numbers represent corresponding parts throughout:

FIGS. 3, 4, and 5 illustrate a configuration of the device addresses used by different controllers to communicate with different virtual tape controllers in accordance with implementations of the invention.

DETAILED DESCRIPTION OF THE PREFERRED EMBODIMENTS

In the following description, reference is made to the accompanying drawings which form a part hereof and which illustrate several implementations of the present invention. It is understood that other implementations may be utilized and structural and operational changes may be made without departing from the scope of the present invention.

Figure 1:
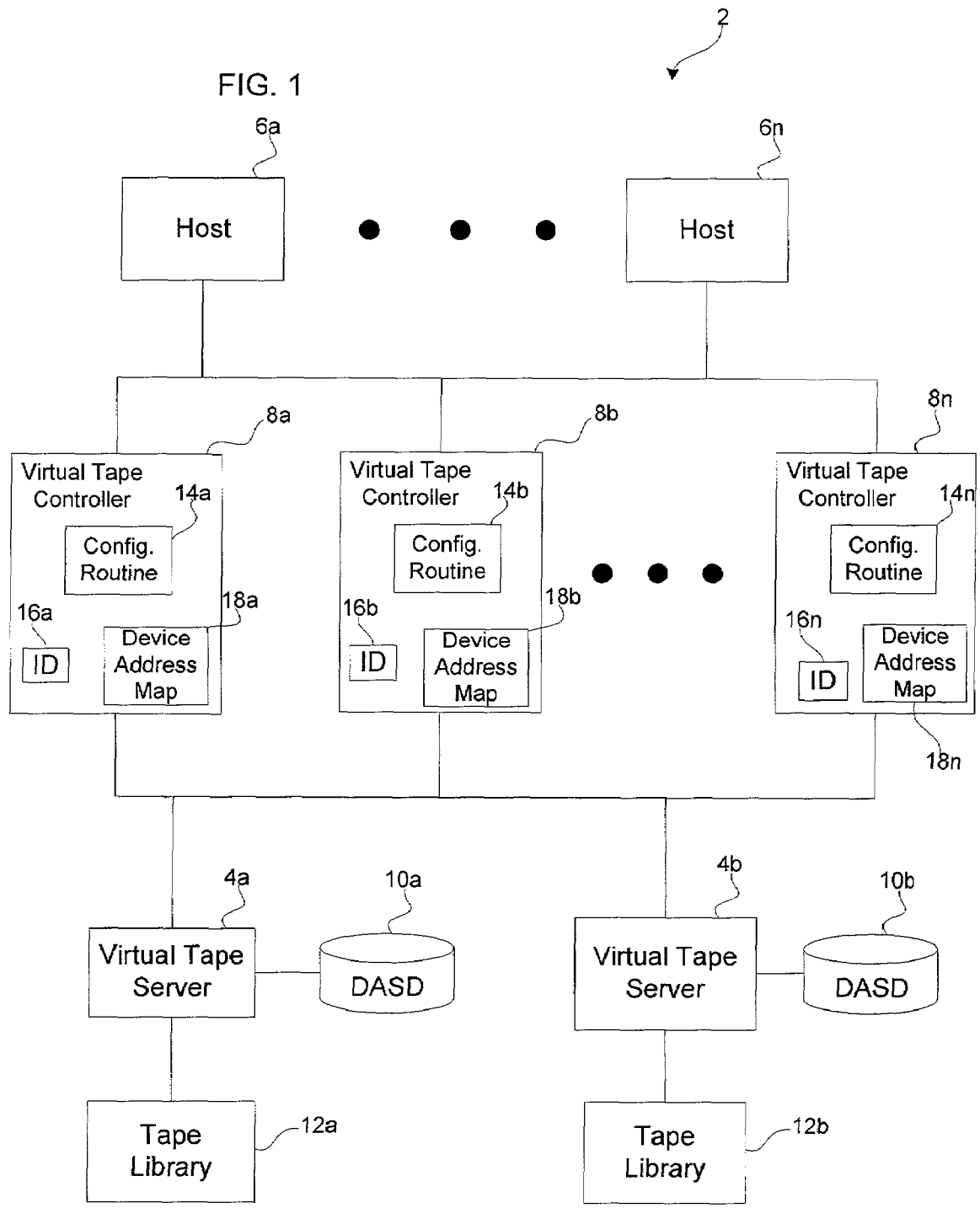
FIG. 1 is a block diagram illustrating a computing environment in which aspects of the invention are implemented.

FIG. 1 illustrates a peer-to-peer computing environment 2 utilizing two virtual tape servers (VTS) 4a, 4b. Additional VTSs may be employed in the peer-to-peer environment 2. A plurality of host computers 6a . . . 6n connect to up to n virtual tape controllers ("VTC") 8a, 8b . . . 8n, where in certain described implementations n is eight. The host computers 6a . . . 6n may connect to the VTCs 8a, 8b . . . 8n through a channel, such as the Enterprise System Connection (ESCON)** channel or any other switching mechanism known in the art (e.g. fibre channel, Storage Area Network (SAN) interconnections etc.). In the peer-to-peer environment, the virtual tape controllers 8a, 8b . . . 8n are transparent to the host computers 6a . . . 6n (i.e. the host systems 6a, 6b operate as if they are to a single virtual tape server). As discussed, the VTCs 8a, 8b . . . 8n route I/O requests from the hosts 6a . . . 6n to one of the VTSs 4a, 4b.

AIX, ESCON, MAGSTAR, and RS/6000, OS/390, Tivoli are registered trademarks of IBM.

In addition, the VTSs 4a, 4b control access to direct access storage devices (DASD) 10 and 10b and tape libraries 12a and 12b, respectively. Each DASD 10a, 10b may comprise numerous interconnected hard disk drives. Each tape library 12a, 12b may comprise numerous tape cartridges which may be mechanically loaded into tape drives that the VTS 4a, 4b may access. The hosts 6a . . . 6n may include any operating system known in the art, such as the IBM OS/390 operating system. The VTSs 4a, 4b may comprise a server system including software to emulate a tape library, such as the IBM Magstar Virtual Tape Server. For instance, the virtual tape servers 4a, 4b and the virtual tape controllers 8a, 8b . . . 8n may be implemented in separate computers comprising an IBM RS/6000 processor, the IBM AIX operating system, and the IBM ADSTAR Distributed Management (ADSM) software or Tivoli Storage Manager to perform the data movement operations between the DASDs 10a, 10b, and tape libraries 12a, 12b. The tape library 12a, 12b may comprise an IBM Magstar Tape Library, such as the Magstar** 3494 Tape Library, or any other tape library system known in the art.

AIX, ESCON, MAGSTAR, and RS/6000, OS/390, Tivoli are registered trademarks of IBM.

The DASDs 10a, 10b provide a tape volume cache, which extends the performance benefits of disk cache to access the volumes in the tape libraries 12a, 12b and improves performance by allowing host I/O requests to the tape libraries 12a, 12b to be serviced from the faster-access DASDs 10a, 10b. The VTSs 4a and 4b would further include hierarchical storage management (HSM) software (not shown), such as the Tivoli Storage Manager, to migrate data from the DASD 10a, 10b to the tape library 12a, 12b and recall data from the tape library 12a, 12b to DASD 10a, 10b when needed. The virtual tape servers 4a, 4b appear to the hosts 6a . . . 6n as tape drives including tape data volumes. The hosts 6a . . . 6n view the virtual tape volumes as actual tape volumes and issue tape management commands, such as mount, and otherwise address the virtual tape servers 4a, 4b as a tape control unit. Further details of the virtual tape server and virtual tape controller technology are described in the IBM publication "Magstar Peer-to-Peer Virtual Tape Server Planning and Implementation Guide," IBM document no. SG24-6115-00 (Copyright IBM, 2000), which publication is incorporated herein by reference in its entirety.

AIX, ESCON, MAGSTAR, and RS/6000, OS/390, Tivoli are registered trademarks of IBM.

Each VTC 8a, 8b . . . 8n includes a configuration routine 14a, 14b . . . 14n to independently determine device addresses to use to communicate with the various system devices. Each VTC 8a, 8b . . . 8n has a unique identifier (ID) 16a, 16b . . . 16n, which in certain implementations comprises an integer value. The IDs 16a, 16b . . . 16n may comprise consecutive integer numbers from 0 to n, wherein there are n minus one VTCs. The IDs 16a, 16b . . . 16n may be set by an administrator of the system 2 and may be maintained as a system setting or in a file in non-volatile memory or storage. The configuration routine 14a, 14b . . . 14n uses the unique identifier to determine the device addresses the VTC 8a, 8b . . . 8n recognizes to communicate with system devices, such as the VTSs 4a, 4b, etc. The determined device addresses are then maintained in a device address map 18a, 18b . . . 18n maintained in memory during runtime. The device address map 18a, 18b . . . 18n indicates the assignment of device addresses to particular system devices, such as customer device addresses (the addresses the hosts 6a . . . 6n use to communicate with the VTSs 4a, 4b), copy device addresses (addresses used to copy updates from one VTS to the other), and broadcast addresses (addresses the VTCs 8a, 8b . . . 8n use to communicate with each other through the VTSs 4a, 4b). Each of the customer device addresses is associated with one of the VTCs 8a, 8b . . . 8n, such that the associated VTC 8a, 8b . . . 8n handles the communication with the VTS 4a, 4b for that customer device address.

Figure 2:
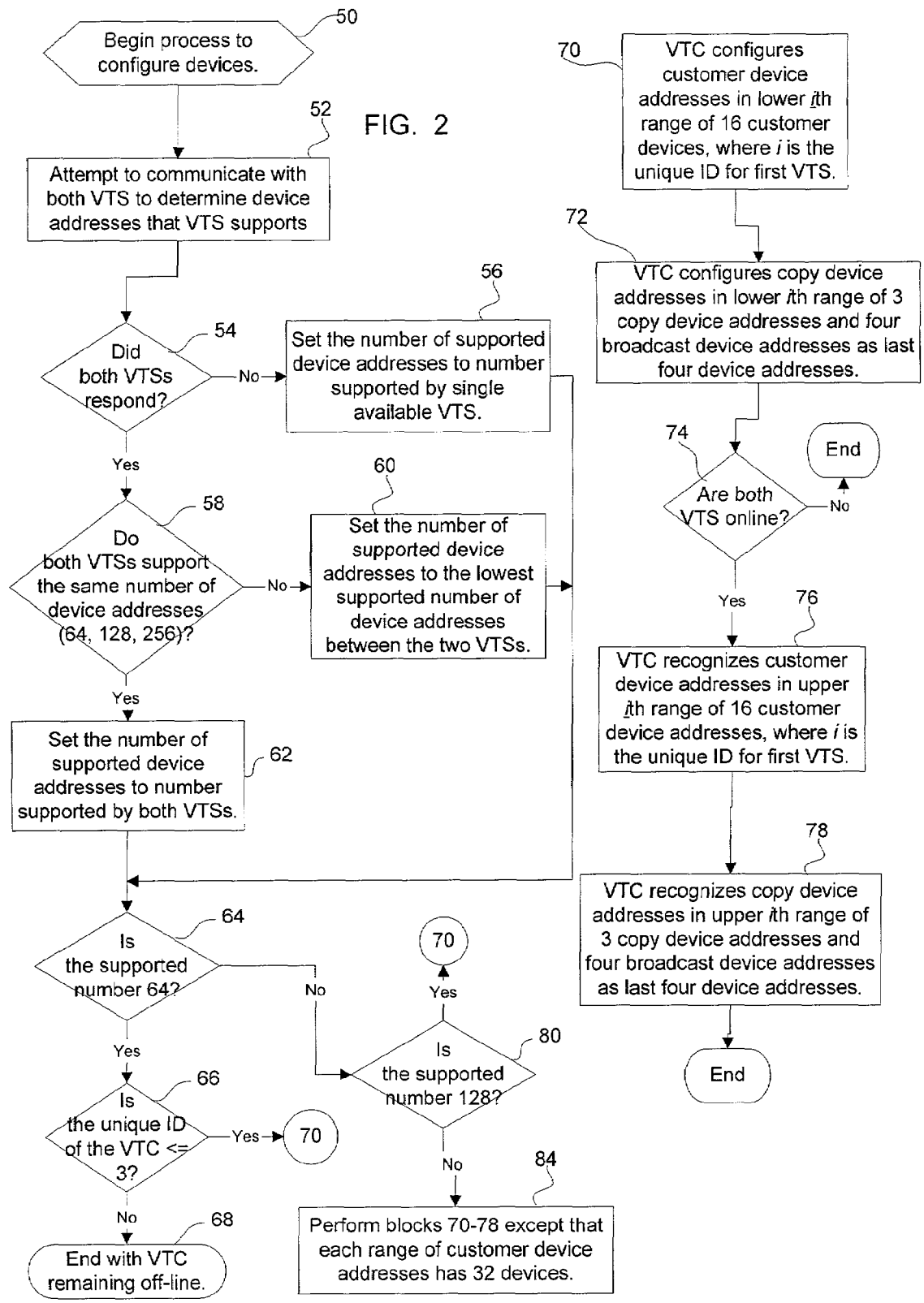
FIG. 2 illustrates logic to configure device addresses in accordance with implementations of the invention.

FIG. 2 illustrates logic implemented in the configuration routines 14a, 14b . . . . 14n executed by each of the VTCs 8a, 8b . . . 8n, respectively. The VTC 8a, 8b . . . 8n attempts to communicate (at block 52) with both VTSs 4a, 4b. In certain implementations, the VTC 8a, 8b . . . 8n would wait at block 50 until communication with at least one VTSs 4a, 4b is established. The configuration operations would proceed to block 54 upon establishing communication with both VTSs 4a, 4b or after thirty seconds (or some other time period) has elapsed communication is established with only one VTS 4a or 4b. If (at block 54) both VTSs 4a, 4b did not respond, then the number of supported devices is set (at block 56) to the number supported by the single available VTS 4a or 4b. Otherwise, if (at block 56) both VTS 4a and 4b responded and if (at block 58) both VTSs do not support the same number of customer device addresses, e.g., 64, 128 or 256, then the number of supported device addresses is set (at block 60) to the lowest supported number of device addresses of both the VTSs 4a and 4b. If (at block 58) both available VTSs 4a and 4b support the same number of device addresses, then the number of supported device addresses is set (at block 62) to the customer device addresses both VTSs 4a, 4b support.

From block 56, 60 or 62, control proceeds to block 64. If (at block 64) the supported number of customer device addresses is 64 and if (at block 66) the unique identifier (ID) 16a, 16b . . . 16n of the VTC 8a, 8b . . . 8n executing the configuration routine 14a, 14b . . . 14n is greater than three, then control ends with the VTC remaining off-line. Because there are only 64 customer device addresses and each VTC is assigned 16 device addresses, the fourth through eighth VTCs, e.g., VTCs 3–7, are not needed and, thus, remain off-line. If (at block 66) the ID 16a, 16b . . . 16n is less than or equal to three, then the configuration routine 14a, 14b . . . 14n configures (at block 70) the customer device addresses in the device address map 18a, 18b . . . 18n as the device addresses in the lower ith range of 16 customer device addresses, where i is the ID of the VTC. The configuration routine 14a, 14b . . . 14n further configures (at block 72) the device address map 18a, 18b . . . 18n to indicate the copy device addresses as the addresses in the lower ith range of three copy device addresses and 4 broadcast device addresses as the last four of the 64 device addresses. The device address assignment is thus maintained in the runtime device address map 18a, 18b . . . 18n, which may be regenerated during initialization. If (at block 74) both VTSs are online, then the configuration routine 14a,14b . . . 14n configures (at block 76) the device address map 18a, 18b . . . 18n to indicate customer device addresses in the upper ith range of 16 customer device addresses, where i is the ID of the VTC. The configuration routine 14a, 14b . . . 14n further configures (at block 78) the device address map 18a, 18b . . . 18n to indicate copy device addresses in the upper ith range of three copy device addresses and 4 broadcast device addresses as the last four of the 64 device addresses.

In the described implementations, when determining the number of customer device addresses the VTS supports, the configuration routine 14a, 14b . . . 14n would have to consider the number of copy device addresses and broadcast device addresses needed in the configuration. For instance, to support 64 customer device addresses, the VTS would need to support 80 device addresses total in order to accommodate the 64 customer device addresses, twelve copy device addresses and four broadcast device addresses. To support 128 customer device addresses, the VTS would need to support 160 device addresses total to accommodate the 128 customer device addresses, 24 copy device addresses (three for each of the eight VTCs) and eight broadcast device addresses. To support 256 customer device addresses, the VTS would need to support 288 device addresses total to accommodate the 256 customer device addresses, 24 copy device addresses (three for each of the eight VTCs) and eight broadcast device addresses.

FIG. 3 provides a table 100 illustrating the device address configuration generated by the configuration routine 14a, 14b . . . 14n logic of FIG. 2 in the event the configuration is for 64 customer device addresses. There are four lower customer device address ranges 102 of sixteen device addresses each for the four VTCs having IDs 16a, 16b . . . 16n less than three, e.g., customer device hexadecimal address ranges of 0–F, 10–1F, 20–2F, 30–3F. There are four lower copy device address ranges 104 above the customer device address ranges, one for each of the four VTCs 8a, 8b . . . 8n having three device addresses, e.g., copy device hexadecimal address ranges of 40–42, 43–45, 46–48, and 49–4B, and four lower broadcast device addresses 106 above the copy device addresses, e.g., the broadcast device hexadecimal address range of 4C–4F. Similarly, there are four upper customer device address ranges 108 one for each of the four VTC having IDs 16a, 16b . . . 16n less than three, e.g., customer device hexadecimal address ranges of 120–12F, 130–13F, 140–14F, 150–15F. There are four lower copy device address ranges 110 above the customer device ranges 108, one for each of the four VTCs 8a, 8b . . . 8n, e.g., copy device hexadecimal address ranges of 160–162, 163–165, 166–169, and 169–16B, and four upper broadcast device addresses 112 above the copy device addresses, e.g., the broadcast device hexadecimal address range of 16C–16F. In certain implementations, the upper address ranges are at a fixed offset from the lower address ranges. As discussed, the lower ranges are used to address one VTS and the upper ranges are used to address the second VTS in the configuration.

With the described implementations, those VTCs 8a, 8b . . . 8n configured to be online maintain in their memory a device address map 18a, 18b . . . 18n having the customer devices addresses that the hosts 6a . . . 6n use to address the VTS 4a, 4b through the particular VTC, the copy device addresses that are used to copy data between the VTSs 4a, 4b, and the broadcast devices addresses which are shared by the available VTCs 8a, 8b . . . 8n to enable intra-VTC communication.

If (at block 80) the number of supported device addresses is 128, then control proceeds to block 70 to perform the configuration using eight VTCs, each configured to recognize sixteen customer device addresses in their device address maps 18a, 18b . . . 18n. FIG. 4 illustrates a configuration space 130 when the VTSs 4a and/or 4b support 128 customer device addresses with hexadecimal device addresses. The configuration space 130 includes lower and upper ranges of customer device addresses 132 and 138, copy device addresses 134 and 140, and broadcast addresses 136 and 142, respectively.

Figure 5:
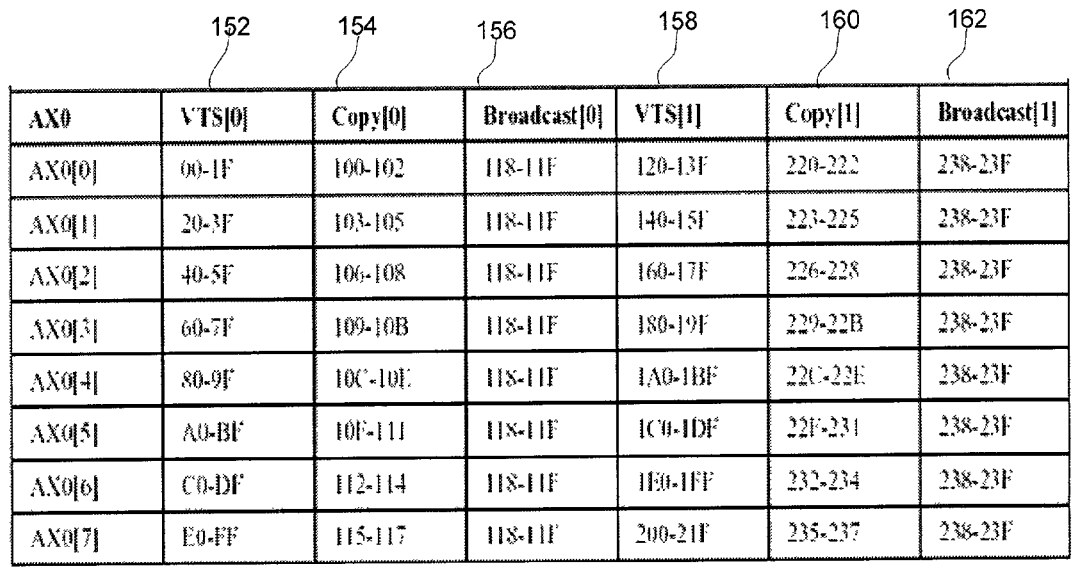

If (at block 80) the number of supported device addresses is 256, then control proceeds to block 84 to perform the steps at blocks 70 through 78, except that each of the VTCs are configured to use 32 customer device addresses FIG. 5 illustrates the configuration space 150 when the VTSs 4a and/or 4b support 256 customer device addresses with hexadecimal device addresses. The configuration space 150 includes lower and upper ranges of customer device addresses 152 and 158, copy device addresses 154 and 160, and broadcast device addresses 156 and 162, respectively.

Once the VTCs 8a, 8b . . . 8n determine their configuration, or share of the customer, copy and broadcast device addresses, and update their respective device address maps 18a, 18b . . . 18n with the determined device addresses to use, the VTCs 8a, 8b . . . 8n may start receiving Input/Output (I/O) requests from the hosts 6a . . . 6n.

Figure 6:
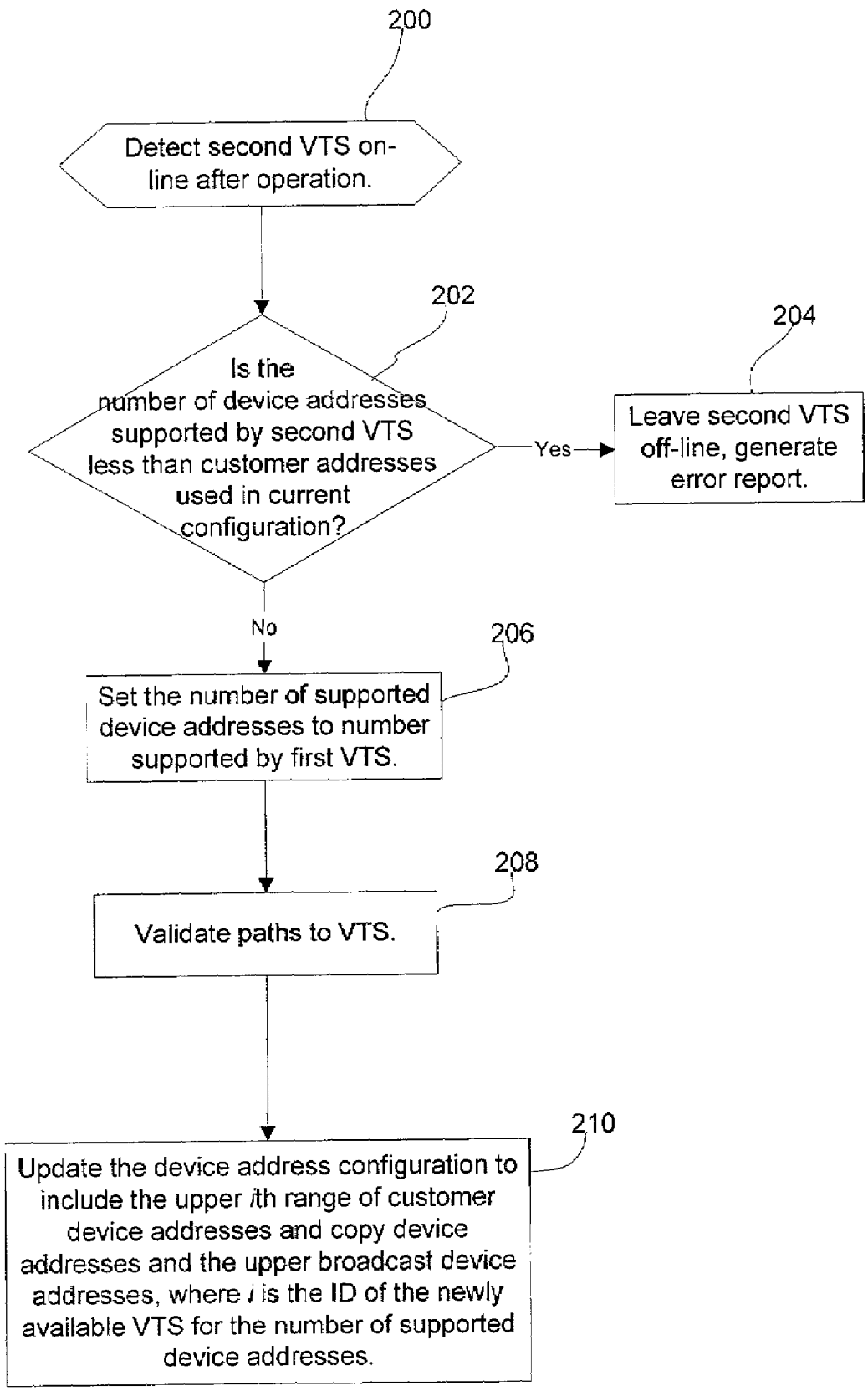
FIG. 6 illustrates logic to configure the device addresses used in the event that a newly available target device is detected.

FIG. 6 illustrates logic implemented in the configuration routine 14a, 14b . . . 14n in each of the VTCs 8a, 8b . . . 8n to handle the situation where the device addresses are configured for only one VTS 4a, 4b and subsequently after the initial configuration, another VTS 4a, 4b becomes available. At block 200, the VTC 8a, 8b . . . 8n detects that another VTS 4a, 4b has become available. If (at block 202) the number of device addresses supported by the newly available VTS 4a, 4b is less than the number of device addresses supported by the already configured VTS, then the VTC 8a, 8b . . . 8n leaves (at block 204) the newly available second VTS 4a, 4b off-line and generates an error report. A system administrator may then adjust the second VTS to increase its capabilities in response to reviewing the error report indicating the cause of the failure to configure the second VTS.

If (at block 202) the number of device addresses supported by the newly available VTS 4a, 4b is greater than or equal to the number of device addresses supported by the configured VTS, then the VTC 8a, 8b . . . 8n sets (at block 206) the number of supported device addresses to the number supported by the already configured VTS and validates (at block 208) the paths to the second newly available VTS. The VTC 8a, 8b . . . 8n then updates (at block 210) the configuration space in its respective device address map 18a, 18b . . . 18n to include the upper ith range of customer and copy device addresses for the VTC 8a, 8b . . . 8n, where i is the ID 16a, 16b . . . 16n of the VTC 8a, 8b . . . 8n performing the configuration, and include the upper broadcast range. The configuration would be performed based on the number of supported device addresses that the already configured first VTS 4a, 4b supports. The result of the logic of FIG. 6 is the addition of the upper device address ranges as shown in one of ranges 108, 110, and 112 in FIG. 3, ranges 138, 140, and 142 in FIG. 4, or ranges 158, 160, and 162 in FIG. 5.

The described implementations provide techniques to allow the VTCs to configure their own device addresses independently of the other VTCs in a manner that takes into account the capabilities of the VTS with which the VTCs communicate and the possibility that a new VTS will become available.

ADDITIONAL IMPLEMENTATION DETAILS

The technique for device address configuration disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Although the implementations have been described in the context of a virtual storage system, variations of the implementations apply to any distributed processing environment where multiple devices must configure an address space to enable communication with at least one other target device, where the other target devices may be capable of different address configurations.

In the described implementations, four or eight virtual tape controllers were configured to enable communication with two virtual tape servers were shown. However, the address configuration techniques disclosed herein may be applied to alternative configurations where there are a different number of virtual tape controllers and virtual tape servers.

Implementations were described with respect to the IBM Peer-to-Peer Virtual Tape Server system. However, the preferred logic could apply to any virtual storage system including magnetic storage or memories when used to cache data from a slower storage system. Moreover, although the implementations were described with respect to a peer-to-peer environment, the preferred logic could apply to other environments such as a client-server environment where copies of the same data is kept at both locations. In addition, the preferred logic could apply to a situation where a copy of the logical volume can be kept in multiple storage devices. For example, the logic can apply in a peer-to-peer-to-peer environment with three separate virtual tape servers where the same logical volume is copied to each virtual tape server.

In the above described implementations, virtual tape controllers were used to select a virtual tape server to handle the recall or I/O access operation. In alternative implementations, the hosts may make such a selection, or the virtual tape servers may determine which virtual tape server to use to handle the recall or access operation.

In the described implementations, multiple devices, e.g., the VTCs, implemented the address configuration logic. In alternative implementations, only one device, e.g., the VTC, may implement the address configuration logic to communicate with the at least one target device, VTS.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for configuring device addresses used by a source device to communicate with at least one target device, comprising:
   determining a number of device addresses supported by a target device;
   determining an identifier of the source device; and
   using the determined identifier and the number of device addresses supported by the target device to determine device addresses from the device addresses supported by the target device to communicate with the target device.

2. The method of claim 1, wherein there are a plurality of source devices each having a unique identifier, and wherein each source device independently determines device addresses supported by the target device, whereby the device addresses determined by the target devices are non-overlapping.

3. The method of claim 2, further comprising:
   determining at least one broadcast device address within the device addresses supported by the target device that is used to communicate with other source devices.

4. The method of claim 1, wherein the target device comprises a first target device wherein determining a number of device addresses supported by the target device further comprises:
   determining the number of device addresses supported by the first target device and a second target device; and
   selecting a minimum of the number of device addresses supported by the first and second target devices, wherein the selected minimum of the number of device addresses is used with the determined identifier to determine the device addresses used to communicate with the first and second target devices.

5. The method of claim 4, wherein using the selected minimum number of device addresses and the determined identifier used to determine the device addresses further comprises:
   using the selected minimum number of device addresses and the determined identifier to determine a first set of device addresses to communicate with the first target device and a second set of device addresses to communicate with the second target device.

6. The method of claim 5, further comprising:
   using the determined identifier to determine a first set of copy device addresses used to copy data from the first target device to the second target device and to determine a second set of copy device addresses used to copy data from the second target device to the first target device.

7. The method of claim 6, wherein the first and second target devices maintain copies of a same set of data volumes, wherein updates to one of the target devices are copied to the other target device using one device address in the first or second sets of copy device addresses.

8. The method of claim 5, further comprising:
   determining a first set of broadcast device addresses within the device addresses supported by the first target device that is used to communicate with other source devices and a second set of broadcast device addresses within the device addresses supported by the second target device used to communicate with the other source devices.

9. The method of claim 5, wherein the target devices comprise virtual tape servers that function as a cache for data volumes in a tape library, wherein the source device comprises virtual tape controllers that enable host systems to communicate tape Input/Output (I/O) requests to the virtual tape servers using the first and second set of device addresses.

10. The method of claim 4, wherein if the selected minimum number of device addresses comprises a predesignated number of device addresses and the determined identifier exceeds a predetermined value associated with the predesignated number of device addresses, then at least one source device having the determined identifier is not configured to use device addresses to communicate with the first and second target devices.

11. The method of claim 10, wherein the selected minimum number of device addresses is capable of comprising one of 64, 128 and 256 device addresses.

12. The method of claim 1, wherein the target device comprises a first target device and the determined device addresses comprise a first set of device addresses, further comprising:
   detecting availability of a second target device;
   in response to detecting the availability of the second target device, determining whether the number of device addresses supported by the second target device is less than the number of device addresses used to address the first target device; and
   using the determined identifier of the source device to determine a second set of device addresses to address the second target device if the number of device addresses supported by the second target device is not less than the number of device addresses configured to address the second target device.

13. The method of claim 12, wherein the number of device addresses configured to address the second target device is equal to the number of device addresses configured to use the first target device.

14. The method of claim 12, wherein no device addresses are configured to use the second target device if the number of device addresses supported by the target device is less than the number of device addresses configured to address the first target device.

15. The method of claim 1, further comprising:
   querying the target device to determine the number of device addresses supported by the target device, wherein the target device indicates the number of supported device addresses.

16. A system for configuring device addresses to communicate with at least one target device, comprising:
   a source device;
   means for determining a number of device addresses supported by a target device;
   means for determining an identifier of the source device; and means for using the determined identifier and the number of device addresses supported by the target device to determine device addresses from the device addresses supported by the target device to communicate with the target device.

17. The system of claim 16, further comprising:
a plurality of source devices, wherein each source device has a unique identifier, and wherein each source device independently determines device addresses supported by the target device, whereby the device addresses determined by the target devices are non-overlapping.

18. The system of claim 17, further comprising:
means for determining at least one broadcast device address within the device addresses supported by the target device that is used to communicate with other source devices.

19. The system of claim 16, wherein the target device comprises a first target device wherein determining a number of device addresses supported by the target device further comprises:
means for determining the number of device addresses supported by the first target device and a second target device; and
mean for selecting a minimum of the number of device addresses supported by the first and second target devices, wherein the selected minimum of the number of device addresses is used with the determined identifier to determine the device addresses used to communicate with the first and second target devices.

20. The system of claim 19, wherein the means for using the selected minimum number of device addresses and the determined identifier used to determine the device addresses further performs:
using the selected minimum number of device addresses and the determined identifier to determine a first set of device addresses to communicate with the first target device and a second set of device addresses to communicate with the second target device.

21. The system of claim 20, further comprising:
means for using the determined identifier to determine a first set of copy device addresses used to copy data from the first target device to the second target device and to determine a second set of copy device addresses used to copy data from the second target device to the first target device.

22. The system of claim 21, wherein the first and second target devices maintain copies of a same set of data volumes, wherein updates to one of the target devices are copied to the other target device using one device address in the first or second sets of copy device addresses.

23. The system of claim 20, further comprising:
means for determining a first set of broadcast device addresses within the device addresses supported by the first target device that is used to communicate with other source devices and a second set of broadcast device addresses within the device addresses supported by the second target device used to communicate with the other source devices.

24. The system of claim 20, wherein the target devices comprise virtual tape servers that function as a cache for data volumes in a tape library, wherein the source device comprises a virtual tape controller that enables host systems to communicate tape Input/Output (I/O) requests to the virtual tape servers using the first and second set of device addresses.

25. The system of claim 20, wherein if the selected minimum number of device addresses comprises a predesignated number of device addresses and the determined identifier exceeds a predetermined value associated with the predesignated number of device addresses, then at least one source device having the determined identifier is not configured to use device addresses to communicate with the first and second target devices.

26. The system of claim 16, wherein the target device comprises a first target device and the determined device addresses comprise a first set of device addresses, further comprising:
means for detecting availability of a second target device;
means for determining whether the number of device addresses supported by the second target device is less than the number of device addresses used to address the first target device in response to detecting the availability of the second target device; and
means for using the determined identifier of the source device to determine a second set of device addresses to address the second target device if the number of device addresses supported by the second target device is not less than the number of device addresses configured to address the second target device.

27. The system of claim 26, wherein the number of device addresses configured to address the second target device is equal to the number of device addresses configured to use the first target device.

28. The system of claim 26, wherein no device addresses are configured to use the second target device if the number of device addresses supported by the target device is less than the number of device addresses configured to address the first target device.

29. The system of claim 16, further comprising:
means for querying the target device to determine the number of device addresses supported by the target device, wherein the target device indicates the number of supported device addresses.

30. An article of manufacture including code for configuring device addresses used by a source device to communicate with at least one target device, wherein the code causes operations to be performed, the operations comprising:
determining a number of device addresses supported by a target device;
determining an identifier of the source device; and
using the determined identifier and the number of device addresses supported by the target device to determine device addresses from the device addresses supported by the target device to communicate with the target device.

31. The article of manufacture of claim 30, wherein there are a plurality of source devices each having a unique identifier, and wherein each source device independently determines device addresses supported by the target device, whereby the device addresses determined by the target devices are non-overlapping.

32. The article of manufacture of claim 31, further comprising:
determining at least one broadcast device address within the device addresses supported by the target device that is used to communicate with other source devices.

33. The article of manufacture of claim 30, wherein the target device comprises a first target device wherein determining a number of device addresses supported by the target device further comprises:
determining the number of device addresses supported by the first target device and a second target device; and selecting a minimum of the number of device addresses supported by the first and second target devices, wherein the selected minimum of the number of device addresses is used with the determined identifier to determine the device addresses used to communicate with the first and second target devices.

34. The article of manufacture of claim 33, wherein using the selected minimum number of device addresses and the determined identifier used to determine the device addresses further comprises:

using the selected minimum number of device addresses and the determined identifier to determine a first set of device addresses to communicate with the first target device and a second set of device addresses to communicate with the second target device.

35. The article of manufacture of claim 34, further comprising:

using the determined identifier to determine a first set of copy device addresses used to copy data from the first target device to the second target device and to determine a second set of copy device addresses used to copy data from the second target device to the first target device.

36. The article of manufacture of claim 35, wherein the first and second target devices maintain copies of a same set of data volumes, wherein updates to one of the target devices are copied to the other target device using one device address in the first or second sets of copy device addresses.

37. The article of manufacture of claim 34, further comprising:

determining a first set of broadcast device addresses within the device addresses supported by the first target device that is used to communicate with other source devices and a second set of broadcast device addresses within the device addresses supported by the second target device used to communicate with the other source devices.

38. The article of manufacture of claim 34, wherein the target devices comprise virtual tape servers that function as a cache for data volumes in a tape library, wherein the source device comprises virtual tape controllers that enable host systems to communicate tape Input/Output (I/O) requests to the virtual tape servers using the first and second set of device addresses.

39. The article of manufacture of claim 33, wherein if the selected minimum number of device addresses comprises a predesignated number of device addresses and the determined identifier exceeds a predetermined value associated with the predesignated number of device addresses, then at least one source device having the determined identifier is not configured to use device addresses to communicate with the first and second target devices.

40. The article of manufacture of claim 39, wherein the selected minimum number of device addresses is capable of comprising one of 64, 128 and 256 device addresses.

41. The article of manufacture of claim 30, wherein the target device comprises a first target device and the determined device addresses comprise a first set of device addresses, further comprising:

detecting availability of a second target device;

in response to detecting the availability of the second target device, determining whether the number of device addresses supported by the second target device is less than the number of device addresses used to address the first target device; and using the determined identifier of the source device to determine a second set of device addresses to address the second target device if the number of device addresses supported by the second target device is not less than the number of device addresses configured to address the second target device.

42. The article of manufacture of claim 41, wherein the number of device addresses configured to address the second target device is equal to the number of device addresses configured to use the first target device.

43. The article of manufacture of claim 41, wherein no device addresses are configured to use the second target device if the number of device addresses supported by the target device is less than the number of device addresses configured to address the first target device.

44. The article of manufacture of claim 30, further comprising:

querying the target device to determine the number of device addresses supported by the target device, wherein the target device indicates the number of supported device addresses.

* * * * *